March 27, 1962 G. A. LYON Re. 25,142

WHEEL COVER

Original Filed Dec. 24, 1952 3 Sheets-Sheet 1

Inventor
George Albert Lyon by Nist, Sherman, Mueris, Cross & Singer Attys

March 27, 1962 G. A. LYON Re. 25,142

WHEEL COVER

Original Filed Dec. 24, 1952 3 Sheets-Sheet 2

Inventor
George Albert Lyon by Hill, Sherman, Meroni, Gross & Simpson Attys

March 27, 1962 G. A. LYON Re. 25,142

WHEEL COVER

Original Filed Dec. 24, 1952 3 Sheets-Sheet 3

Inventor
George Albert Lyon by Weil, Sherman, Mesmer, Grave & Simpson Attys

United States Patent Office

Re. 25,142
Reissued Mar. 27, 1962

25,142
WHEEL COVER

George Albert Lyon, 13881 W. Chicago Blvd., Detroit, Mich.

Original No. 2,713,518, dated July 19, 1955, Ser. No. 327,783, Dec. 24, 1952. Application for reissue Aug. 30, 1961, Ser. No. 136,972
11 Claims. (Cl. 301—37)

Matter enclosed in heavy brackets [ ] appears in the original patent but forms no part of this reissue specification; matter printed in italics indicates the additions made by reissue.

The present invention relates to improvements in wheel structures and more particularly concerns the provision of improved cover means for the outer side of the wheel to simulate a wire spoke wheel.

An important object of the present invention is to provide a wheel structure of non-spoke type provided at the outer side thereon with a cover affording the appearance for the wheel of a wire spoke-type wheel.

Another object of the invention is to provide an improved wheel cover for disposition at the outer side of a vehicle wheel.

Another object of the invention is to provide a novel cover to be disposed at the outer side of a non-spoke wheel to afford the illusion that the wheel is of the spoke-type.

Still another object of the invention is to provide an improved composite wheel cover.

It is another object of the invention to provide an improved method of making a spoke-type wheel cover.

Other objects, features and advantages of the present invention will be readily apparent from the following detailed description of a preferred embodiment thereof taken in conjunction with the accompanying drawings, in which.

Figure 2:
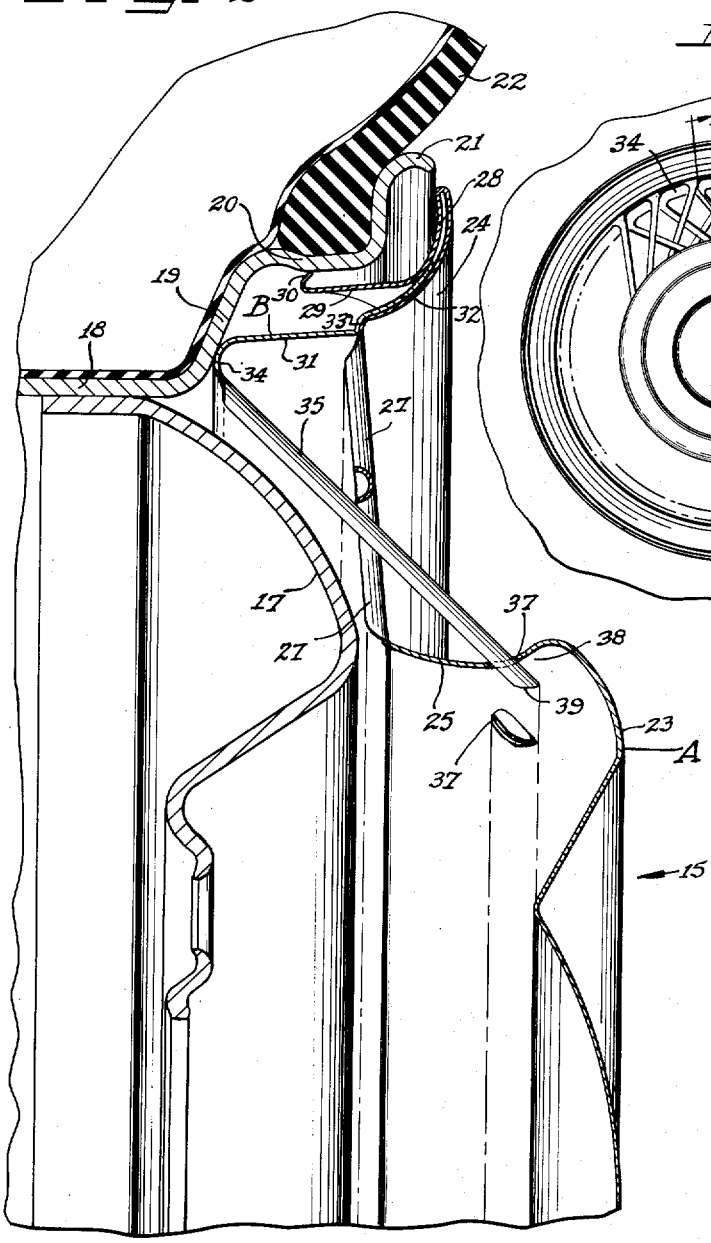
FIGURE 2 is an enlarged fragmentary sectional detail view taken substantially along the line II—II of FIGURE 1.

According to the present invention, a spoke-type cover 15 is applied to the outer side of a vehicle wheel of the conventional disk spider-type comprising a disk spider wheel body 17 peripherally secured to a base flange 18 of a tire rim. The tire rim includes a side flange 19 that extends generally radially outwardly and slopes axially outwardly from the base flange 18 and merges with an intermediate flange 20 leading into a terminal flange 21 of the tire rim. The flanges of the tire rim cooperate to provide a drop center structure which will support a pneumatic tire and tube assembly 22.

The cover 15 comprises a principal or outer cover component A and an inner or secondary cover component B which are assembled together to provide a composite cover structure for press-on pry-off disposition at the outer side of the wheel.

Figure 1:
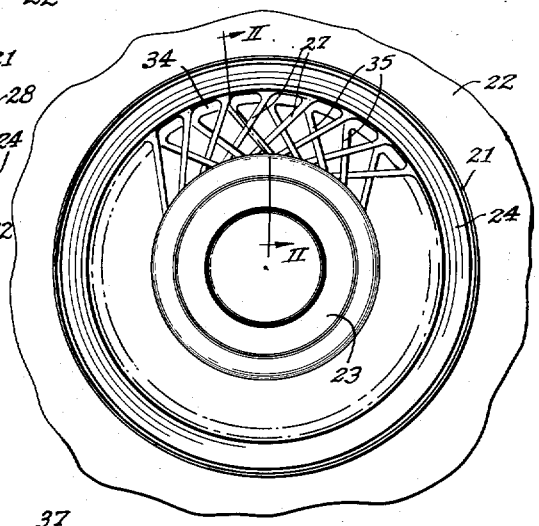
FIGURE 1 is a side elevational view of a wheel embodying features of the invention.
Figure 3:
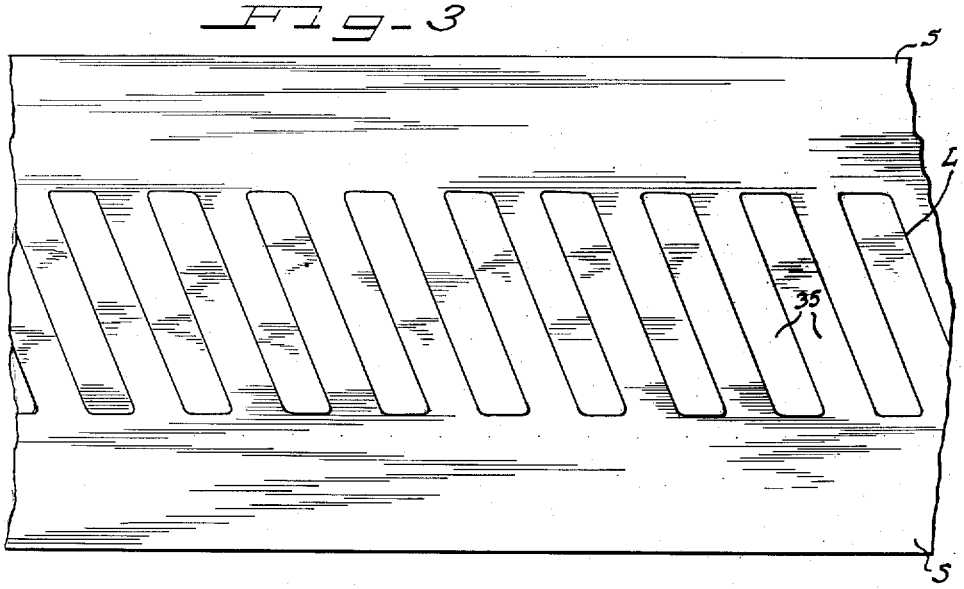
FIGURE 3 is a plan view of a blank from which portions are derived for one of the components of the cover.

The crown cover member 23 preferably comprises a sheet metal plate of brass or stainless steel or the like which is stamped or drawn to shape and includes a central crown portion 23 for overlying the central portion of the wheel body 17 and an annular outer marginal portion 24 which is dimensioned to overlie the tire rim. The central crown portion 23 has a generally axially inwardly extending side wall or flange 25 having the extremity thereof connected by integral spoke portions, or elements 27 with the inner edge of the outer annular portion 24. The spoke elements 27 are of rounded cross-section, affording them rib stiffness, and they are appropriately angled in a peripheral direction, as for example generally clockwise as best seen in FIGURE 1.

By preference the outer annular cover portion 24 carries means for attaching the cover to the wheel. To this end, the outer annular cover portion 24 is formed in transversely arched rib-like form to substantially overlie the intermediate and terminal flanges 20 and 21 of the tire rim, and is formed with an underturned return bent flange 28. The flange 28 extends generally radially and axially inwardly behind the annular cover portions 24 and has extending therefrom generally axially inwardly an appropriate annular series of resilient retaining finger extensions 29. Each of the retaining finger extensions is formed with a short and stiff radially and axially outwardly angled retaining terminal 30 which engages edgewise in retaining biting, gripping relation against the inner side of the intermediate flange 20. Initially the tips of the retaining finger terminals 30 extend to a greater diameter than the inside diameter of the intermediate flange 20 so that the cover can be applied to the wheel by pressing the same inwardly to cause the retaining finger terminals 30 to cam inwardly along the intermediate flange 20 and gradually assume a substantially tensioned gripping engagement at their tips against the intermediate flange.

The inner or secondary cover member B, preferably comprises an annular body portion 31 extending generally axially and having an outer marginal flange 32 generally complementary to and engaging against the back of the cover portion 24 and with its extremity gripped between the cover portion 24 and the underturned flange 28. At juncture of the body portion 31 with the flange 32, an angular offsetting, reenforcing shoulder flange 33 is provided.

At its inner margin, the inner cover member body 31 is formed with an inturned generally radially inwardly and axially outwardly extending annular rib-like flange 34 from which project integrally in one piece spoke elements 35 of rounded, rib-like cross-section. The spoke elements 35 angle opposite to the spoke elements 27 and preferably extend generally radially inwardly and axially outwardly through the spoke elements 27 in crossing relation and with the terminal extremity portions of the spoke elements 35 engaging the side wall flange 25 of the crown portion 23 of the outer cover member A.

For retention of the terminal portions of the spoke elements 35, the side wall flange 25 is provided with an annular series of appropriate apertures 37 adjacent to the juncture of the flange 25 with the crown 23 through which the terminal portions of the spoke elements are engaged and retainingly secured. To facilitate assembly and to improve the structural relationship of the elements, the side flange 25 is formed with [a] generally undercut or overhanging shoulder flange portions 38 adjacent to the juncture of the crown portion 23. By preference the apertures 37 are provided at the juncture of the axially extending portion of the flange 25 convergently with the shoulder portions 38 of the flange.

In the fully assembled relation of the cover 15 with the wheel, the inner flange 34 shoulders against the side flange 19 of the tire rim to limit the inward disposition of the cover, and then retains the cover in spaced relation to the wheel body 17. In addition, the outer margin of the cover is maintained in spaced relation to the tire rim 21 so as to accommodate wheel balancing weights therebehind. It will be observed that the annular area defined by the two crossing series of spoke elements 27 and 35 overlies the juncture portions of the tire rim and the wheel body, and when the cover is on the wheel the illusion is afforded that the wheel is of the spoke-type.

Figure 8:
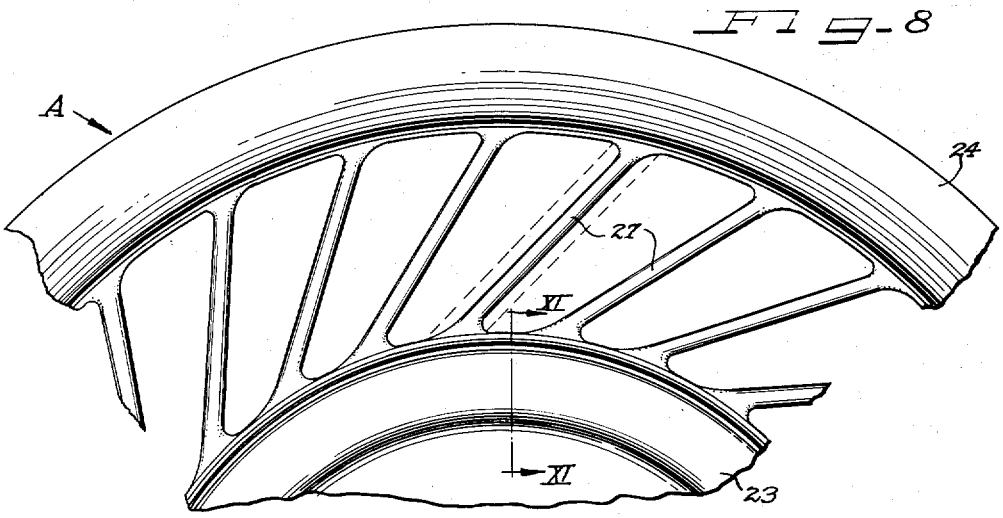
FIGURE 8 is a fragmentary side elevational view of the main cover component prior to assembly therewith of the secondary or ring cover component.
Figure 11:
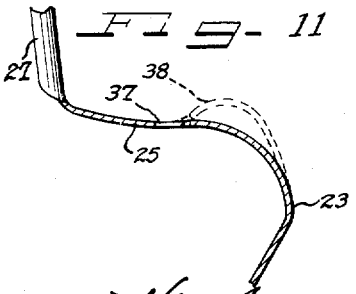
FIGURE 11 is a fragmentary transverse sectional detail view taken substantially on the line XI—XI of FIGURE 8.

As stated hereinbefore, the cover member A is preferably made as a stamping from appropriate sheet metal, that is it is subjected to a series of drawing and stamping die operations to shape or form the same. As best seen in FIGURES 8 and 11, the crown portion 23 and the annular outer portion 24 are shaped and the area intervening between these portions is cut out at uniform intervals to provide the spoke connections 27 which are originally of substantial width as indicated in dash outline in FIGURE 8, but are then shaped to the transversely arcuate rib contour. To facilitate shaping of the crown portion 23, the side wall flange 25 thereof is, as best seen in FIGURE 11, initially formed to merge directly with the crown portion and without the overhanging shoulder flange 30 which is subsequently formed therein as indicated in dash outline in FIGURE 11 by bulging or expanding the juncture of the flange 25 with the crown portion 23 radially outwardly into overhanging relation to the flange 25.

Figure 4:
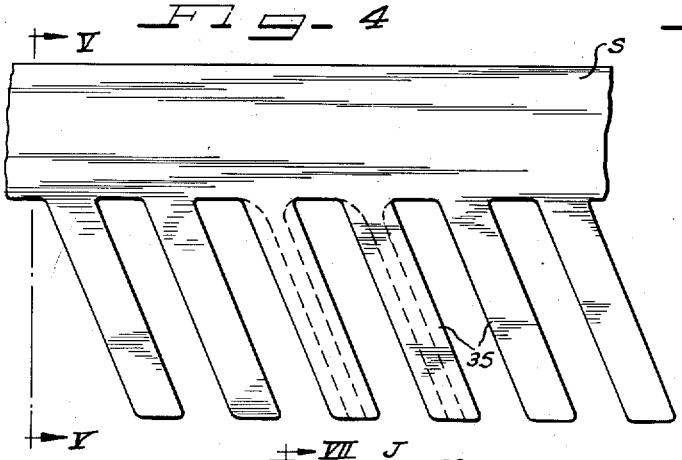
FIGURE 4 is a fragmentary plan view of one portion of the separated blank of FIGURE 3.
Figure 5:
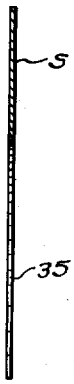
FIGURE 5 is a transverse sectional view taken substantially on the line V—V of FIGURE 4.

By preference the inner annular cover member B is formed by a rolling operation. To this end, a strip S of appropriate sheet material such as brass or stainless [sheet] *steel* is severed along a uniformly tortuous severance line L to provide two identical strips each of which has identical spoke extensions 35 from one edge. The strips S are separated and, as shown in FIGURE 4 the spoke extensions 35 are shaped from the original flat condition to the transversely contoured form desired as indicated in dash outline. It will be understood that the strip of material may be polished before the individual cover strips S are severed therefrom.

Figure 6:
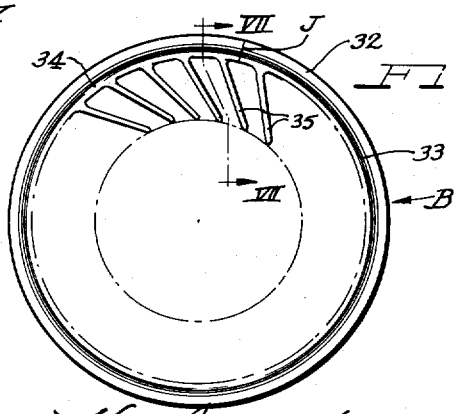
FIGURE 6 is a side elevational view of the cover component made up from the blank of FIGURE 4.
Figure 7:
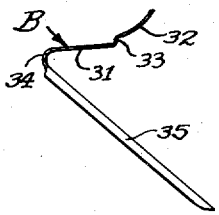
FIGURE 7 is a fragmentary, enlarged generally radial sectional view taken substantially on the line VII—VII of FIGURE 6.

After the spoke extensions have been shaped, the strip S forming an individual one of the cover members B is rolled into the proper shape to provide the inner cover member annulus B and the ends of the strips are permanently secured together as by welding, thus providing a joint J which is buffed off smooth. The completed cover annulus B then has the form shown in FIGURES 6 and 7.

Figure 9:
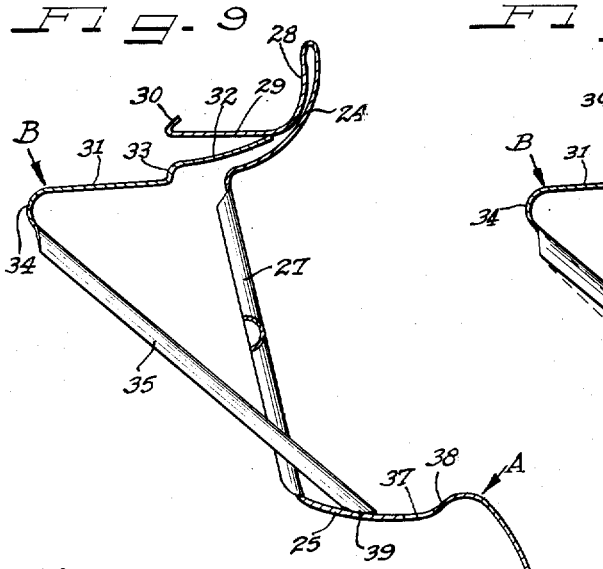
FIGURE 9 is a more or less schematic view showing a preliminary step in the assembly of the cover components.
Figure 10:
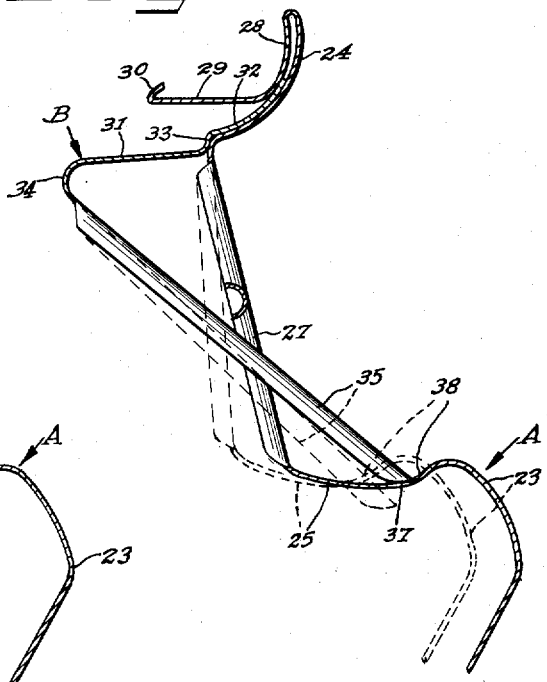
FIGURE 10 is a schematic view similar to FIGURE 9 but showing the cover components in further steps in the assembly thereof.

Assembly of the cover components A and B is preferably effected as depicted in FIGURES 9 and 10. As a preliminary, the annular inner cover member B is assembled with the outer cover member A by extending the end portions of the spoke extensions 35 through the openings between the spoke elements 27 and with tapered tips 39 on the spoke extensions 35 engaging against the radially outer side of the crown side wall flange 25, while the outer marginal flange 32 engages at the inner side of the finger extensions 29, as shown in FIGURE 9, and then relative axial assembly movement of the cover components A and B is effected to bring the outer marginal flange 32 into nested engagement at the back of the annular cover portion 24, thereby engaging the extremity of the flange 32 between the annular cover member 24 and the underturned flange 28. A limit upon relative axial assembly is defined by engagement of the shoulder 33 as a stop against the rib-like juncture at the inner margin of the cover portion 24 where the spoke elements 27 integrally join the same.

While during the axial relative assembly of the cover components the tips 39 of the spoke extensions 35 ride axially outwardly on the crown side flange 25, and may, if preferred, enter into the interengaged relationship within the apertures 37, the preferred mode of final assembly is shown in FIGURE 10. Thus, the crown portion 23 of the outer cover member is formed initially to project axially outwardly to a greater extent relative to the marginal cover portion 24 than ultimately desired, as shown in full outline in FIGURES 9 and 10. The relationship is such that when the outer flange 32 of the inner cover member is fully seated against the marginal cover portion 24, the extremities of the spoke extensions 35 will just register with the apertures 37 and with the extremities guided into the apertures by reason of the axial outermost sides of the apertures being tilted out by virtue of the shoulder 38. Then, as the final assembly step, the crown portion 23 is shifted axially inwardly as indicated in dash outline in FIGURE 10 and into the final set relationship thereof with respect to the marginal cover portion 24 and the inner cover component B. This causes the spoke members 27 to assume a more nearly straight radial relationship and the junctures at the opposite ends of the spoke members 27 are bent to the final set relationship. At the same time the extremity portions of the spoke extensions 35 of the inner cover member ride into the apertures 37 to a substantial extent and the spoke elements 35 are placed under resilient tension by the tilting action to which they are subjected as indicated in FIGURE 10. The resulting assembly of the cover components is snug and firm and free from looseness. If desired, the extremity portions of the spoke elements 35 that project into the chamber defined by the hub portion 23 of the cover may be die set or clenched or otherwise operated upon to set the same permanently against any tendency to withdraw from the apertures 37.

It will be understood that modifications and variations may be effected without departing from the scope of the novel concept of the present invention.

I claim as my invention:

1. In a wheel structure including a tire rim and a wheel body, the tire rim having a base flange and an intermediate flange, axially outer and inner cover members, the axially outer cover member comprising a radially inner portion and a radially outer marginal portion spaced apart and connected by spoke elements, said outer marginal portion having an underturned flange thereon formed with axially inwardly extending resilient finger extensions having short and stiff generally radially outwardly directed retaining terminals engageable retainingly with the intermediate flange of the tire rim, said axially inner cover member comprising an annulus including a portion thereof engaging the outer marginal portion of the axially outer cover member and having the body thereof extending generally axially inwardly and engageable with said tire rim side flange, a portion of said axially inner cover member engageable with the side flange having a series of spoke extensions therefrom projecting through the openings between the connecting spokes of the axially outer cover member and having their extremities retainingly engaging the radially inner portion of the outer cover member.

2. In a wheel structure including a wheel body and a tire rim supported by the wheel body and having a side flange and an intermediate flange, a cover for disposition at the outer side of the wheel and comprising an axially outer cover member and an axially inner cover member, said axially outer cover member having a crown portion to overlie the wheel body and an annular marginal portion spaced from the crown portion and connected thereto by a series of spoke elements, said annular marginal portion having thereon means for engaging one of the tire rim flanges retainingly, said axially inner cover member comprising an annular portion retainingly engaging said annular marginal portion of the axially outer cover member and having spoke elements directed generally radially inwardly into engagement with said crown portion, said axially inner cover member having a shoulder engageable against the side flange of the tire rim.

3. In a wheel structure including a wheel body and a tire rim supported by the wheel body and having a side flange and an intermediate flange, a cover for disposition at the outer side of the wheel and comprising an axially outer cover member and an axially inner cover member, said axially outer cover member having a crown portion to overlie the wheel body and an annular marginal portion spaced from the crown portion and connected thereto by a series of spoke elements, said annular marginal portion having thereon means for engaging a flange of the tire rim retainingly, said axially inner cover member comprising an annular portion, retainingly engaging said annular marginal portion of the axially outer cover member and having spoke elements directed generally radially inwardly into engagement with said crown portion, said axially inner cover member having a shoulder engageable against the side flange of the tire rim, said retaining means comprising resilient retaining fingers and said shoulder limiting the axially inward movement of the cover so as to hold the axially outer cover member out of engagement with the tire rim and the wheel body except for the engagement of said fingers with the rim flange.

4. In a cover for disposition at the outer side of a vehicle wheel, said cover comprising an axially outer cover member and an axially inner cover member, said axially outer cover member having a radially inner cover portion and an annular outer marginal portion connected to the inner cover portion by integral spoke elements, said outer marginal cover portion having cover retaining means thereon for engagement with a tire rim on a wheel, said axially inner cover member having a portion engaging said outer marginal cover portion and provided with a series of spoke extensions having their extremity portions engaging the radially inner portion of the axially outer cover member.

5. In a cover for disposition at the outer side of a vehicle wheel, a cover plate having a central portion and a radially outer marginal portion with a series of uniform apertures between said portions dividing the intermediate portion of the plate into a series of connecting spoke elements, the outer marginal portion of the plate having an underturned flange provided with retaining finger extensions for retaining engagement with a flange of a tire rim, and an annular axially inner cover member having a portion thereof engaging said marginal cover portion and having a series of spoke extensions extending generally radially inwardly and engaging the central cover portion.

6. In a cover for disposition at the outer side of a vehicle wheel, a cover plate having a central portion and a radially outer marginal portion with a series of uniform apertures between said portions dividing the intermediate portion of the plate into a series of connecting spoke elements, the outer marginal portion of the plate having an underturned flange provided with retaining finger extensions for retaining engagement with a flange of a tire rim, and an annular axially inner cover member having a portion thereof engaging said marginal cover portion and having a series of spoke extensions extending generally radially inwardly and engaging the central cover portion, said axially inner annular cover member having a flange engaged between the outer marginal cover portion and said underturned flange.

7. In a cover for disposition at the outer side of a vehicle, an axially outer cover member and an axially inner cover member, said axially outer cover member comprising a radially inner portion and a spaced annular marginal portion with an intermediate connecting portion having a series of apertures therein dividing the same into connecting spoke elements, said marginal portion having an underturned flange provided with retaining finger extensions, said axially inner cover member comprising an annulus having a flange portion internested behind said outer annular cover portion and with a flange portion assembled between the outer annular cover portion and said underturned flange and with another portion extending axially inwardly beyond said outer annular cover portion and provided at its inner extremity with generally radially inwardly and axially outwardly projecting spoke extensions extending through the openings in the intermediate portion of the outer cover member and having the extremities thereof engaging the inner portion of the axially outer cover member.

8. In a cover for disposition at the outer side of a vehicle, an axially outer cover member and an axially inner cover member, said axially outer cover member comprising a radially inner portion and a spaced annular marginal portion with an intermediate connecting portion having a series of apertures therein dividing the same into connecting spoke elements, said marginal portion having an underturned flange provided with retaining finger extensions, said axially inner cover member comprising an annulus having a flange portion internested behind said outer annular cover portion and with a flange portion assembled between the outer annular cover portion and said underturned flange and with another portion extending axially inwardly beyond said outer annular cover portion and provided at its inner extremity with generally radially inwardly and axially outwardly projecting spoke extensions extending through the openings in the intermediate portion of the axially outer cover member and having the extremites thereof engaging said radially inner portion, said radially inner portion having a generally radially outwardly facing wall with respective apertures therein through which the extremity portions of said spoke extensions are retainingly engaged.

9. In a cover for disposition at the outer side of a vehicle, an axially outer cover member and an axially inner cover member, said axially outer cover member comprising a radially inner portion and a spaced annular marginal portion with an intermediate connecting portion having a series of apertures therein dividing the same into connecting spoke elements, said marginal portion having an underturned flange provided with retaining finger extensions, said axially inner cover member comprising an annulus having a flange portion internested behind said outer annular cover portion and with a flange portion assembled between the outer annular cover portion and said underturned flange and with another portion extending axially inwardly beyond said outer annular cover portion and provided at its inner extremity with generally radially inwardly and axially outwardly projecting spoke extensions extending through the openings in the intermediate portion of the axially outer cover member and having the extremities thereof engaging said radially inner portion, said radially inner portion having a generally radially outwardly facing wall with respective apertures therein through which the extremity portions of said spoke extensions are retainingly engaged, said side wall having a shoulder at the outer sides of said apertures facing generally radially outwardly and axially inwardly in generally overhanging relation to the spoke extensions.

*10. In a cover for disposition at the outer side of a vehicle wheel, a cover plate having a central portion and a radially outer marginal portion with a series of uniform apertures between said portions dividing the intermediate portion of the plate into a series of connecting spoke elements, the outer marginal portion of the plate having*

*an underturned flange provided with retaining finger extensions for retaining engagement with a flange of a tire rim, and an annular axially inner cover member having a portion thereof engaging said marginal cover portion and having a series of spoke extensions extending generally radially inwardly and engaging the central cover portion, said cover plate and cover member comprising stampings with their spoke extensions extending generally radially and with the spoke extensions of one crossing the other in an axial direction.*

*11. In a cover for disposition at the outer side of a vehicle wheel, a cover plate having a central portion and a radially outer marginal portion with a series of uniform apertures between said portions dividing the intermediate portion of the plate into a series of connecting spoke elements, the outer marginal portion of the plate having an underturned flange provided with retaining finger extensions for retaining engagement with a*

*flange of a tire rim, and an annular axially inner cover member having a portion thereof engaging said marginal cover portion and having a series of spoke extensions extending generally radially inwardly and engaging the central cover portion, the spoke elements of said cover plate and said cover member extending generally radially with those of one crossing those of the other in an axial direction, and in an X-like arrangement.*

References Cited in the file of this patent or the original patent

UNITED STATES PATENTS

| | | |
|---|---|---|
| 1,754,466 | Hosking | Apr. 15, 1930 |
| 2,192,403 | Ingersoll | Mar. 5, 1940 |
| 2,422,689 | Lyon | June 24, 1947 |

FOREIGN PATENTS

| | | |
|---|---|---|
| 714,587 | France | Sept. 7, 1931 |